US007033968B1

(12) United States Patent
Bons et al.

(10) Patent No.: US 7,033,968 B1
(45) Date of Patent: Apr. 25, 2006

(54) PROCESSES FOR THE MANUFACTURE OF SUPPORTED MATERIALS

(75) Inventors: Antonie Jan Bons, Kessel-Lo (BE); Marc H. Anthonis, Hofstade (BE)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/936,312

(22) PCT Filed: Mar. 10, 2000

(86) PCT No.: PCT/EP00/02129

§ 371 (c)(1),
(2), (4) Date: Feb. 12, 2002

(87) PCT Pub. No.: WO00/53298

PCT Pub. Date: Sep. 14, 2000

(30) Foreign Application Priority Data

Mar. 11, 1999 (GB) .............................. 9905560

(51) Int. Cl.
*B01J 20/28* (2006.01)

(52) U.S. Cl. ............................. 502/4; 502/60; 502/62; 502/64; 502/71; 502/77

(58) Field of Classification Search .................. 502/4, 502/60, 62, 64, 71, 77
See application file for complete search history.

(56) References Cited

U.S. PATENT DOCUMENTS

| 5,258,339 | A | | 11/1993 | Ma et al. |
| 5,753,121 | A | | 5/1998 | Geus et al. |
| 5,763,347 | A | * | 6/1998 | Lai .................... 502/4 |
| 6,037,292 | A | * | 3/2000 | Lai et al. ............ 502/60 |
| 6,051,517 | A | * | 4/2000 | Funke et al. ........ 502/4 |
| 6,190,638 | B1 | * | 2/2001 | Anthonis et al. .... 423/702 |
| 2003/0104925 | A1 | * | 6/2003 | Lai et al. ............ 502/4 |

FOREIGN PATENT DOCUMENTS

| WO | WO 93/19840 | 10/1993 |
| WO | WO 94/25151 | 11/1994 |
| WO | WO 96/01686 | 1/1996 |
| WO | WO 97/33684 | 9/1997 |

OTHER PUBLICATIONS

Yan Y et al: "Use of diffusion barriers in the preparation of supported zeolite ZSM–5 membranes", Journal of Membrane Science, NL, Elsevier Scientific Publ. Company. Amesterdam, vol. 126, No. 1, (1997) p. 53–65.

* cited by examiner

*Primary Examiner*—Kiley Stoner
*Assistant Examiner*—Christina Ildebrando
(74) *Attorney, Agent, or Firm*—Linda A. Kubena; James A. Zboray; Gerard J. Hughes (57) ABSTRACT

A process is described for the manufacture of a crystalline molecular sieve layer on a support, which process comprises impregnation of the support with an impregnating material prior to deposition of a crystalline molecular sieve layer and subsequent removal of substantially all the impregnating material.

19 Claims, 2 Drawing Sheets

Fig. 1.

PROCESSES FOR THE MANUFACTURE OF SUPPORTED MATERIALS

This invention relates to a method for the preparation of supported crystalline molecular sieve layers.

Inorganic materials find extensive use as catalysts and membranes. In a number of applications it is desirable and sometimes essential that the inorganic material is used in conjunction with a physical support structure. The support structure may be required to ensure adequate mechanical strength of the inorganic material when for example it is in the form of a layer. In other applications it enables the easy application and removal of the inorganic material from, for example, a catalyst bed.

There are numerous methods described in the art for the manufacture of support materials for inorganic catalysts and membranes. There is however a continual need for improved methods of support preparation and manufacture of supported crystalline molecular sieve layers.

When supports are used in the manufacture of crystalline molecular sieve layers they may suffer a number of problems which are dependent, inter alia, on the techniques used for manufacturing the crystalline molecular sieve layer. When the crystalline molecular sieve layer is a molecular sieve layer which has been manufactured using hydrothermal synthesis techniques a number of problems may arise. Firstly, unwanted material may be deposited within the support s resulting in unwanted catalytic sites and/or reduction in porosity of the support. Secondly, the support material may not be inert under the synthesis conditions used; this may result in the support dissolving to an unacceptably significant extent and/or the incorporation of unwanted material from the support into the crystalline molecular sieve layer. Thirdly, after deposition of the crystalline molecular sieve layer the complete structure may lack acceptable mechanical integrity resulting in cracking and/or delamination problems.

In International Application WO 94/25151 is described a supported inorganic layer comprising optionally contiguous particles of a crystalline molecular sieve, the mean particle size being within the range of from 20 nm to 1 μm. The support is advantageously porous. When the pores of the support are covered to the extent that they are effectively closed, and the support is continuous, a molecular sieve membrane results; such membranes have the advantage that they may perform catalysis and separation simultaneously if desired. A number of processes are described in WO 94/25151 for the manufacture of the inorganic layers disclosed therein. WO94/25151 describes the use of a barrier layer which prevents the water in the aqueous coating suspension used from preferentially entering the pores of the support to an extent such that the silica and zeolite particles form a thick gel layer on the support. The barrier layer may be temporary or permanent; temporary barrier layers are fluids such as water or glycol.

Gavalas et. al describe the use of a specific barrier in zeolite membrane synthesis; "Use of diffusion barriers in the preparation of supported zeolite ZSM-5 membranes", Journal of Membrane Science, 126 (1997), 53–65. In their method a mixture of furfuryl alcohol and tetraethylorthosilicate (TEOS) is impregnated into a support, after which the mixture is polymerised by exposure to p-toluene sulfonic acid at elevated temperature and the resulting polymer is carbonized. After deposition of the zeolite membrane the carbon is removed under calcination conditions, however the TEOS is converted to a silicate which is deposited within and remains in the pores of the support. Prior to deposition of the zeolite layer the carbonised polymer is selectively and deliberately removed from the top region of the support.

The support manufactured according to the present invention overcomes some or all of the problems identified above depending on the properties of the support used and the method of manufacture of the crystalline molecular sieve layer. The resultant support structure provides improved control during subsequent deposition processes which may be used for the manufacture of crystalline molecular sieve layers. The support structure prepared by the process of the present invention, enable control over where the molecular sieve is to be deposited and/or assist in maintaining the integrity of the combined support and layer structure. They also assist in ensuring reproducible manufacture of the crystalline molecular sieve layer and assist in overcoming problems associated with dissolution of the support.

In a specific embodiment the method of the present invention provides crystalline molecular sieve layers which have good properties compared to molecular sieve layers in the art for both catalytic and/or membrane applications.

The present invention therefore provides in a first aspect a process for the manufacture of a crystalline molecular sieve layer, which process comprises:

a) impregnating a porous support through at least one surface thereof, with an impregnating material which is not carbonised prior to deposition on the support of a crystalline molecular sieve layer, b) hydrothermally growing a crystalline molecular sieve layer on a surface of the impregnated porous support; and c) substantially completely removing the impregnating material.

As examples of porous supports, there may be mentioned porous glass, sintered porous metals, e.g., steel or nickel, inorganic oxides, e.g., alpha-alumina titania, cordierite, zeolite as herein defined, or zirconia and mixtures of any of these materials. In this context porous supports include supports which have pores which are occluded; such supports, whilst having pores which are not suitable for membrane separation applications, may be used for catalytic applications or separation processes which are not membrane separation processes such as for example adsorption or absorption.

The pore size and porosity of the support should be compatible with the process employed for depositing the crystalline molecular sieve. The porous support may be any material compatible with the coating and synthesis techniques utilised in the process of the present invention. For example porous alpha-alumina with a surface pore size within the range of 0.08 to 1 μm, most preferably from 0.08 to 0.16 μm, and advantageously with a narrow pore size. Ideally the support should have a relatively high degree of porosity so that the support exerts an insignificant effect on flux through the finished product. Preferably the porosity of the support is 30% by volume or greater; preferably 33% or greater ideally within the range 33 and 40% by volume. The support may be multilayered; for example, to improve the mass transfer characteristics of the support; in this context the support may be an asymmetric support. In such a support-the surface region which is in contact with the molecular sieve seeds may have small diameter pores, while the bulk of the support toward the surface remote from the crystalline e molecular sieve may have larger diameter pores. An example of such a multilayered asymmetric support is an alpha-alumina disk having pores of about 1 μm average coated with a layer of alpha-alumina with average pore size of about 0.1 μm. A further example of a multilayered support is a large pore metal based support which has an inorganic layer (either metal or non-metal) deposited thereon of smaller pore size compared to the metal support. It is to be understood that when the support is a molecular sieve as herein defined and at least at its surface it has the requisite properties to function as a molecular sieve seed as defined below, in relation to particle size and cystallinity, then the support surface itself may act as the molecular sieve seed and deposited molecular sieve seeds, as described below, may be dispensed with. Zeolite supports may however also be used in conjunction with a deposited molecular sieve seeds. Suitable supports include the composite membranes and layers manufactured according to U.S. Pat. No. 4,981,590 and U.S. Pat. No. 5,089,299.

At least one surface of the support is capable of receiving the crystalline molecular sieve layer or when used a molecular sieve seed layer. The preparation of this surface will depend on the quality, chemical or physical properties of the support when considered in combination with the desired method of deposition of the crystalline molecular sieve layer or, when used, the molecular sieve seed layer.

Thus some support materials will require chemical or mechanical treatment to ensure that they are chemically and/or physically compatible with the crystalline molecular sieve layer. For example, rigorous cleaning of the support surface may be required to remove undesirable surface contamination. Physical abrasion may be used to provide a smooth support surface for deposition. In one form of preparation prior to impregnation a seed layer may be deposited for use in seeded molecular sieve growth.

It is preferred that the support is such that it is substantially inert under hydrothermal reaction conditions. It is preferred that substantially no chemical component of the support participates in the molecular sieve synthesis and as a result becomes incorporated within the structure of the crystalline molecular sieve layer. This is particularly advantageous when the crystalline molecular sieve layer is to function as a catalyst material or to act as the support for a catalyst material; in these circumstances incorporation of unwanted chemical species into the structure of the crystalline molecular sieve layer may be detrimental to these functions. Also if the crystalline molecular sieve layer is to be used as a membrane, incorporation of unwanted chemical species from the support into the layer may adversely affect the permeation properties of the layer. The process of the present inventions assists in preventing such dissolution of the support and unwanted incorporation of support material in the molecular sieve material.

The support may and preferably is cleaned prior to deposition of the crystalline molecular sieve or when used the molecular sieve seeds. Suitable cleaning techniques include ultrasonic treatment in water, pentane, acetone or methanol. This may be followed by a period of drying from a few minutes to 24 hours under ambient conditions or under temperatures up to 1000° C., preferably 500 to 700° C. The cleaning regime may comprise a combination of cleaning steps. Such a combination may be a series of washing steps with different solvents and/or dying steps. Each solvent washing step may be utilised in combination with ultrasound.

The impregnating material may be any material which substantially remains at its selected location within the support during subsequent process steps used for deposition of the crystalline molecular sieve e.g. hydrothermal synthesis conditions, and deposition of the molecular sieve seed layer if this occurs after impregnation, and which is substantially stable under such process condition, at least for the time scale of the process.

The impregnation material selected must remain substantially within the support, and must remain substantially stable, under the deposition conditions so as not to interfere with the deposition process and to ensure that a crystalline molecular sieve of the desired quality and properties is obtained in the process.

Ideally the impregnation material should have a viscosity which enables easy impregnation into the support. The properties of the impregnation material ideally are such that it may be impregnated into the support under capillary action, applied pressure or a vacuum. Further, the impregnation material should be compatible with the physical properties of the s surface to ensure that it can wet the surfaces of the support and intimately contact with it.

Water and glycol are nut suitable as impregnation mad because they do not remain at any location in the support, selected for the impregnating material, under hydrothermal synthesis conditions.

The impregnation material should also be capable of being easily and substantially completely removed from the support after formation of the crystalline molecular sieve. Ideally at least the bulk of the impregnating material is capable of being removed under an applied pressure, by washing of the support with a suitable solvent, via calcination, via melting or any combination of these methods. It is preferred that the impregnation material is capable of being removed under calcination conditions which are normally used in the manufacture of molecular sieve materials such as those used in zeolite synthesis. It is important that the impregnation material can easily be removed in order to ensure that as little residual impregnation material as possible, and preferably no residual impregnation material, remains which could impair the performance of the crystalline molecular sieve.

The preferred impregnation materials include natural or synthetic organic resins e.g hydrocarbon resins. In the context of the present invention hydrocarbon means an organic material which has as its main components hydrogen and carbon but does not preclude the presence of one or more heteroatomic species e.g. oxygen or nitrogen or chlorine. One preferred class of impregnating material are the hydrocarbon resins which are free of heteromatoms. If a heteroatom is present it is preferred that it is oxygen or chlorine. Examples of suitable resins are acrylic resins, PVC resins and the hydrocarbon waxes, ethylene-butene copolymers and polyisobutylenes.

Examples of suitable acrylic resins are the L R White Rest manufactured and supplied by the London Resin Co. These are hydrophilic acrylic rein of low viscosity (typically 8 mPa.s) which are commercially available in three grades of hardness; LR1280 hard grade, LR1281 medium grade and LR1282 soft grade. These resins may be thermally or cold cured, with or without the use of an accelerator such as LR1283.

Suitable hydrocarbon resins include for example the hydrocarbon waxes such as Exxon ESCOMER™ H101 and H231. H101 has a molecular weight within the range 1600 to 2300 and a viscosity at 121° C. of approximately 25.5 mPa.s, at 140° C. of approximately 17 mPa.s and at 190° C. of approximately 9 mPa.s. H231 has an approximate molecular weight of 6590 and a viscosity at 121° C. of approximately 600 mPa.s.

An example of a suitable impregnating material incorporating PVC is a PVC plastisol. Such plastisols are well known in the art and typically comprise PVC in combination with plasticizer, stabiliser and viscosity depressor.

A further example of suitable impregnating materials are ethylene-butylene resins of molecular weight 300 to 10000 or polyisobutylenes of molecular weight 500 to 5000.

When a molecular sieve seed layer is used it may be deposited prior to or after impregnation of the support; preferably in one embodiment it is deposited prior to impregnation of the support. In this instance after impregnation of the support there may be quantities of impregnating material located on the surface of the molecular sieve seed layer, which has already been deposited on the support. If this layer of impregnating material is relatively thin or discontinuous then surprisingly it may not have an adverse effect on the seeding properties of the molecular sieve seed layer and need not be removed or if some removal is desired need not be completely removed. This is especially the case where the impregnating material is mildly unstable under the conditions used for subsequent deposition of the line molecular sieve layer e.g. hydrothermal synthesis conditions, and is slowly dissolved in the synthesis mixture. Such a material, in accordance with the requirements of the process of the present invention, has acceptable stability. Examples of materials which have this property include, the hydrocarbon waxes, acrylic resins and ethylene/butene resins described above. If necessary excess impregnation material may be removed from the surface of the molecular sieve seed layer by any suitable means. One suitable means, in the case where a co-solvent is used for impregnation, is to use the same solvent to clean the surface of the seed layer. When no co-solvent is used then any suitable solvent for the resin may be used to clean the seed layer surface. The thickness of this surface deposited layer of impregnation material should be less than 1 μm and preferably it should be less than 0.5 μm, and most preferably less than 0.1 μm.

The most preferred resins are the hydrocarbon wax resins which may easily impregnate the support and which are removed from the support under calcination temperatures that are normally used in zeolite synthesis, with or without prior melting of the bulk material.

Materials which have been found to be unsuitable as impregnating materials include some low molecular weight hydrocarbons e.g hexadecane, silicone oils and polyimide resins. This is believed to be mainly due to their propensity for relatively rapid removal from the support under the conditions used for deposition of the crystalline molecular sieve layers.

Any suitable impregnation material may be used alone or in combination with other impregnation materials and/or other materials which may be required to assist in their impregnation. For example PVC resins may advantageously be impregnated into the support as a solution in THF; the THF being evaporated prior to deposition of molecular sieve seed layer and/or crystalline molecular sieve layer. Other suitable solvents may be used in conjunction with the resins. The resins may be applied in the molten form under ambient pressure conditions or under an applied pressure; for example hydrocarbon waxes are advantageously applied in the molten form.

The impregnation stage may be and preferably is repeated one or more times to ensure that the pores of the support, which are at or proximate to the surface for deposition of the molecular sieve seed layer when used or the crystalline molecular sieve, are substantially filled with impregnating material. Alternatively impregnation may be undertaken for extended periods of time to achieve the same result as repeated impregnation stages. In the case of hydrocarbon wax as impregnating material the impregnation time is typically in the order of 2 minutes or more at 150° C. under vacuum, ideally 2 to 5 minutes; for the same material an extended impregnation time is greater tan 5 minutes and ideally in the order of 20 minutes or more under the similar conditions. Wax impregnation may usefully be and preferably is undertaken for an hour or more at 150° C. under an applied vacuum.

In one embodiment the support is impregnate through surfaces of the support other than the surface onto which the crystalline molecular sieve layer is to be deposited. For example a support in the form of a disk may be impregnated through one side only, the other side being the surface onto which the molecular sieve seed layer if used or the crystalline molecular sieve layer are to be deposited. In one embodiment, the impregnation may be partial in order to fill the pores of the surfaces other than the surface onto which the crystalline molecular sieve layer is to be deposited. This partial filling of the pores of the support is acceptable if it results in improved performance of the crystalline molecular sieve layer compared to that manufactured without impregnation. Partial impregnation is particularly suitable when a molecular sieve seed layer is used and the crystalline molecular sieve layer is deposited via hydrothermal synthesis utilising a zeolite synthesis solution which comprises colloidal silica. Surprisingly the combination of a seed layer and colloidal silica in the synthesis solution, allows the use of partial impregnation. Impregnation may be continued until substantially all the pores of the support are impregnated including pores proximate to the surface of the molecular sieve seed. In the case of wax impregnation this may be observed visually by an optical change in the support and the degree of impregnation can be confirmed by cross-section SEM. In a further embodiment the support may be impregnated through the molecular sieve seed layer when used.

After impregnation the nature of the organic resin may be such that it is advantageous to cure the resin in-situ prior to use of the impregnated support in the manufacture of a crystalline molecular sieve layer. This curing ensures that the resin remains in the impregnated location during subsequent manufacture of the crystalline molecular sieve layer. Advantageously and preferably the impregnating material has a melting point at or above the temperature used in the process for manufacture of the crystalline molecular sieve layer. It is not essential that the impregnating material is or remains solid within the support during manufacture of the crystalline molecular sieve layer. It may become liquid or molten during this manufacture; this is acceptable if in this physical state the impregnating material meets the requirements described in detail above i.e. remains stable and in the desired location within the support.

In a further aspect the process of the present invention may utilise a further process step which is undertaken prior to impregnation of the porous support. When used in conjunction with impregnation this additional process step provides further control in the process and further improvements in performance and ease of manufacture. This further process step may be referred to as pre-impregnation masking and involves deposition of a removable coating onto the support surface which in due course will receive the crystalline molecular sieve layer. The pre-impregnation masking step enables a more accurate and effect impregnation stage to between. The pre-impregnation masking is applied to the appropriate surface of the porous support such that it does not impregnate the support or only impregnates, to a limited extent, the surface region of the support. After deposition of the pre-impregnation masking the support is then impregnated as described above, ideally so that the impregnating material comes into contact with or close proximity to the pre-impregnation masking. Once impregnation is completed the pre-impregnation masking may be removed and the remaining process steps undertaken in order to manufacture the crystalline molecular sieve.

The pre-impregnation masking may be applied before or after deposition of a molecular sieve seed layer, when used, on the support. When applied to a support which already has a molecular sieve seed layer deposited on its surface the pre-impregnation masking offers the additional benefit of protecting the molecular sieve seed layer surface from contamination with the impregnating material. When the pre-impregnation masking is applied to a support which does not have a seed layer deposited on its surface the seed layer is advantageously applied after removal of the pre-impregnation masking onto a high quality impregnated support. Of particular benefit is the use of such a high quality impregnated support with the monolayer seeding method described in WO97/33684. When this seeding method is used in conjunction with pre-impregnation masking good quality crystalline molecular sieve layers may be produced.

An important factor in pre-impregnation masking is to ensure that the material used for the masking is able to intimately contact the surface of the support and is compatible with the impregnating material and method of impregnation. If contact properties are inadequate impregnating material may fill spaces which arise between the pre-impregnation masking and the support; the resultant region of impregnating material on the support surface prevents subsequent deposition and growth of the crystalline molecular sieve and can thus lead to a poor quality a when this is the desired structure.

The steps required for pre-impregnation masking include; cleaning of the support surface, coating the support surface with an appropriate masking material, impregnation of the masked support and removal of the masking material after impregnation.

The methods used to clean the support surface may be the same as those indicated above for preparation of the support for impregnation. A preferred method is to rinse the support in acetone and filtered ethanol (0.1 μm filter, Anotop™ Whatman) followed by drying.

The material used for the pre-impregnation masking may be any material which can be easily applied to the surface of the support and which may be readily removed after impregnation without significant disturbance to the impregnation material. The pre-impregnation masking material must be compatible with the sure of the porous support so as to effectively wet and coat substantially the whole of the desired region for masking. The choice of pre-impregnation masking material will also depend on the nature of the support e.g its surface properties such as polarity. Examples of suitable pre-impregnation masking materials include organic polymers. Of particular interest for the masking of inorganic and asymmetric support such as ceramics, in particular alpha-alumina, are polar polymeric materials such as the acrylic polymers and resins. A preferred masking material is polymethylmethacrylate (PMMA). An example of a suitable PMMA polymer is CM205 of MW 100,000 g/mole with a polydispersity of 1.8. An example of a polymer which is less suitable for use as a masking material with asymmetric alpha-alumina supports is polystyrene; it is believed that this is due to its relatively low polarity. Preferred organic polymers therefore have a polarity which is greater than that of polystyrene. The masking material may be applied in a number of ways. One method is to melt the organic polymer and to apply this to the surface of the support. A further and preferred method is to apply the organic polymer from solution in a suitable solvent for the polymer. In this context a true solution may not be formed and the solvent simply reduces the viscosity of the masking material for ease of application. A particularly useful solvent for PMMA is acetone. Preferably, the PMMA as masking material is applied as a solution of 1 part PMMA in 3.75 parts acetone. The solution of masking material is applied to the support and the deposited material is carefully dried to remove the solvent if used. Too rapid a drying process may lead to ineffective masking. In the case of PMMA applied via acetone the solvent is removed by drying at a rate of 1° C./h to 150° C. Impregnation of the masked support may be undertaken as described above.

After impregnation, the pre-impregnation masking material is removed. A suitable method for removal is washing with a suitable solvent. In the case of PMMA and other polar masking materials, a suitable solvent is acetone or the solvent that was used in the application of the mask. After solvent removal of the masking material the impregnated support surface that was in contact with the masking material may be further treated and preferably is further treated with an ammonia solution, ideally a 0.1 M ammonia solution. After this treatment the impregnated support may be utilised for the deposition of a seeding layer, preferably using the monolayer technique, and deposition of a crystalline molecular sieve layer.

The crystalline molecular sieve may be deposited on the surface of the impregnated support as individual particles which are substantially located within the same plane after deposition, or in the form of a contiguous layer of particles where there is contact of substantially all particles with at least one of its neighbours. It may also be deposited in the form of a continuous film of material. Any crystalline molecular sieve may be used in the process of the present invention. Methods of their deposition are well known in the art. Examples of suitable crystalline molecular sieve materials include catalysts either in the particulate form or as a layer, alone or in combination with other materials such as intercalating compounds and binders. The methods for the manufacture of supported catalysts are well known in the art and such methods as they relate to deposition of the active catalyst material on the support may be utilised in the present invention. Another example of a crystalline molecular sieve layer in accordance with the present inventions is an inorganic membrane.

A particularly preferred crystalline molecular sieve layer for use in the present invention is one based on molecular sieve materials such as zeolite material, either in the form of catalysts or in the form or membrane layers The crystalline molecular sieve may, for example, be a crystalline molecular sieve seed layer precursor to a molecular sieve membrane as described below. It may be a molecular sieve membrane layer alone or in combination with such a seed layer.

The porous inorganic support may comprise a crystalline molecular sieve seed layer and the impregnating material may be impregnated into the seed layer only or into the seed layer and the base support material.

The crystalline molecular sieve layer may be manufactured using techniques which are well known in the art. For example suitable methods of manufacture of molecular sieve layers are described in U.S. Pat. No. 5,110,478, U.S. Pat. No. 5,100,596, U.S. Pat. No. 5,019,263, U.S. Pat. No. 5 069 794, EP 0 481 658, EP 0 481 659, EP 0 481 660, EP 0 632 743, NL9100217, NL9101126, NL9101148, NL 9201204 and WO 94/25151. The disclosures of which in so far as they relate to deposition of molecular sieve layers are incorporated by reference.

The preferred method for the manufacture of the molecular sieve layer is a seeded hydrothermal synthesis process.

The supports of the present invention are particularly useful in such processes for the manufacture of molecular sieve layers. These methods are described in WO 96/01683, WO 96/01685, WO 96/01686, WO 96/01687 and PCT/EP97/01267.

In this method the seed layer comprises molecular sieve crystals of average particle size 200 nm or less. Advantageously, the crystal size of the molecular sieve in the seed layer is 100 nm or less ideally within the range 5 to 100 nm and most preferably within the range 25 to 75 nm.

The seed layer may consist substantially of molecular sieve material only, or it may be a composite layer of the molecular sieve seed material and intercalating material which may be organic or inorganic. The particles of the seed layer may be contiguous or non-contiguous; preferably they are contiguous. The intercalating material may be the same material as the support. The preferred molecular sieve seed crystals are colloidal in nature and capable of forming a stable colloidal suspension The colloidal molecular sieve seed crystals may be prepared by processes which are well known in the art such as those described in International Applications WO93/08125, WO97/03019 WO97/03020 WO97/03021 and WO94/05597, the disclosures of which in so far as they refer to the manufacture of colloidal seeds and there use in the manufacture of layers, are incorporated by reference.

The molecular sieve seed may be applied to the support by techniques known in the art such as for example sol-gel coating techniques, spin-coating, wash-coating, spray-coating, brushing, slip-casting or dip-coating, these processes preferably being undertaken with a suspension of the colloidal molecular sieve crystals.

The colloidal crystals are preferably applied to the support by spin-coating, the viscosity of the mixture, solids concentration and the spin rate inter alia controlling the coating thickness. The mixture may firstly be contacted with the stationary support, then after a short contact time the support is spun at the desired rate. Alternatively the mixture is contacted with a support which is already spinning at the desired rate.

When present as a discrete layer, the thickness of the molecular sieve seed layer is advantageously 3 µm or less, more advantageously at most 2 µm, preferably 1 µm or less and most preferably 0.5 µm or less. Advantageously, the seed layer is of sufficient thickness to cover irregularities of comparable scale in the surface of the support. Advantageously, the seed layer is at most the thickness of the subsequently deposited crystalline molecular sieve layer.

In one embodiment the seed layer may be deposited and used as a monolayer. Such a monolayer and its method of deposition is described in WO97/33684, the disclosure of which in so far as it relates to the manufacture of a molecular sieve seed monolayer is incorporated by reference. It is preferred that the molecular sieve seed layer is one that has substantially a monolayer thickness. It is preferred that this monolayer is deposited via the charge reversal method utilising a cationic polymer as described in WO97/33684.

In one aspect of the process of the present invention the support may be impregnated and placed into the molecular sieve synthesis mixture without any further treatment of the seed layer after its deposition. Even when submerged in the synthesis mixture, the particles in the seed layer remain adhered to the support and facilitate growth of the zeolite layer. However, under some circumstances, e.g. during stirring or agitation of the synthesis mixture, the adhesion between the particles and the support may be insufficient and steps must be taken to stabilise the seed layer.

Therefore, in another aspect of the invention, the molecular sieve seed layer is stabilised before impregnation or before being placed into the synthesis mixture. This stabilisation can be achieved in one aspect by heating the seed layer, e.g at temperatures between 30 and 1000° C. ideally greater than 50° C. and more preferably between 200° C. and 1000° C. and most preferably greater than 300° C. and between 400° C. and 600° C., for several hours preferably at least two hours and most preferably 2 to 10 hours.

In a further embodiment the seed layer molecular sieve crystals are synthesized in situ on the support before the crystalline molecular sieve layer is applied by hydrothermal treatment of a synthesis mixture in the presence of the support. In this embodiment the support is impregnated as described above, prior to deposition of the seed layer. According to this embodiment, the process comprises preparing a first synthesis mixture comprising a source of silica and an organic structure directing agent in a proportion sufficient to effect substantially complete dissolution of the silica source in the mixture at the boiling temperature of the mixture, contacting the support in the synthesis mixture, crystallizing zeolite from the synthesis mixture onto the support, to form the seed layer. This procedure may be carried out as described in the above-mentioned Application WO 94/25151. The resulting coated support is then immersed in a second synthesis mixture and subjected to hydrothermal treatment.

The composition of the synthesis solution is selected to provide the desired molecular sieve or molecular sieve type. When the crystalline molecular sieve layer comprises silicon in its framework then the $H_2O$ to $SiO_2$ ratio must be within the range of 7 to 100. Preferred silicon sources include tetraethylorthosilicate (TEOS) and colloidal silica when the support is partially impregnated. Preferably the $H_2O$ to $SiO_2$ ratio in the synthesis mixture is within the range of 7 to 70, more preferably 7 to 60, and most preferably within the range 7 to 20. For certain molecular sieves such as aluminophosphates (ALPO's) a source of silica is not required.

The composition of the synthesis mixture vanes according to the process; the mixture always contains sources of the various components of the desired molecular sieves and usually contains a structure directing agent. A preferred colloidal silica source is an ammonia-stabilised colloidal silica, e.g., that available from du Pont under the trade mark Ludox AS-40. The use of colloidal silica is preferred when the support is partially impregnated and a seed layer is deposited on the surface capable of receiving the crystalline molecular sieve layer.

The source of silicon may also be the source of potassium, in the form of potassium silicate. Such a silicate is conveniently in the form of an aqueous solution such, for example, as that sold by Aremco Products, Inc. under the trade mark CERAMA-BIND, which is available as a solution of pH 11.3, specific gravity 1.26, and viscosity 40 mPa.s. Other sources of silicon include, for example, silicic acid.

As other sources of potassium, when present, there may be mentioned the hydroxide. Whether or not the synthesis mixture contains a potassium source, it may also contain sodium hydroxide to give the desired alkalinity.

The structure directing agent, when present, may be any of those commonly used in zeolite synthesis. For the manufacture of an MFI layer, a tetrapropylammonium hydroxide or halide is advantageously used.

For the manufacture of an MFI type zeolite, especially ZSM-5 or silicalite-I, the synthesis mixture is advantageously of a molar composition, calculated in terms of oxides, within the ranges:

| | |
|---|---|
| M₂O:SiO₂ | 0 to 0.7 to :1 preferably 0 to 0.350:1, |
| SiO₂:Al₂O₃ | 12 to infinity :1 |
| (TPA)₂O:SiO₂ | 0 to 0.2:1 preferably 0 to 0.075:1 |
| H₂O:SiO₂ | 7 to 100:1 preferably 9 to 70:1 | wherein TPA represents tetrapropylammonium and M is an alkali metal, preferably sodium or potassium, although it may also be Li, Cs or ammonia. Other template agents may be used in these ratios. In the embodiment where pre-impregnation masking is not used its is most preferred that the $M_2O:SiO_2$ molar ratio is within the range 0.016 to 0.350:1, and preferably that the that the $H_2O:SiO_2$ molar ratio is within the range 7 to 60:1, more preferably 9 to 30:1, and most preferably 9 to 20:1.

In this specification ratios with infinity as the value indicate that one of the ratio materials is not resent in the mixture.

The hydrothermal synthesis is preferably undertaken at a temperature of between 60 and 180° C. and for a period within the range 1 to 200 hours. In a preferred aspect the process of the present invention utilises a hydrothermal synthesis temperature of 140° C. or less, preferably within the range from 60 to 100 ° C., and most preferably within the range 60 to 90° C. When pre-impregnation masking is used the preferred temperature range is 60 to 100° C.

In a preferred aspect the process of the present invention utilises a sync time of 4 to 100 hours, in particular 4 to 80 hours and most preferably 4 to 36 hours. The time of reaction will vary depending on the temperature used during the hydrothermal synthesis and may be adjusted accordingly with shorter synthesis times generally being applicable when higher synthesis temperatures are used.

The hydrothermal treatment advantageously is undertaken in an autoclave under autogenous pressure. However with synthesis temperatures below 100° C. it is possible to undertake the synthesis under ambient pressure conditions.

After deposition of the crystalline molecular sieve layer the impregnating material is substantially completely removed by any of the methods or combination of methods indicated above. The removal method chosen will depend to some extent on the exact nature of the impregnating material. The essential requirement is that the removal method is capable of removing substantially all of the impregnated material. One suitable method is to utilise the final calcination step in the molecular sieve synthesis process to remove the impregnating material.

After crystallisation, the structure comprising the support and deposited crystalline molecular sieve layer with or without impregnating material may be washed, dried, and the crystalline molecular sieve calcined. The calcination conditions preferably comprise slow heating and cooling to ensure that the structure, and in particular the crystalline molecular sieve layer, remains intact with the minimum amount of cracking and/or delamination. Preferably, the structure is calcined at a temperature of 350 to 600° C., preferably 450 to 550° C. It is preferred that the structure is raised to the desired calcination temperature at a rate of 0.1 to 6° C. per minute most preferably 02 to 3° C. per minute.

In relation to the processes described herein contacting is to be understood to include immersion or partial immersion of the substrate in the relevant zeolite synthesis mixture.

The crystalline molecular sieve layer may be any known molecular sieve material for example it may be a silicate, an aluminosilicate, an aluminophosphates (ALPO's), a silicoaluninophosphate, a metalloaluminophosphate, or a metalloaluminophosphate.

The preferred molecular sieve will depend on the chosen application, e.g. separation, catalytic applications, and combined reaction and separation, and on the size of the molecules being treated. There are many known ways to tailor the properties of the molecular sieves, for example, structure type, chemical composition, ion-exchange, and activation procedures.

Representative examples are molecular sieves/zeolites which may be used in the molecular sieve layer include the structure types AFL AEL, BEA, CHA, EUO, FAU, PER, KFI, LTA, LTL, MAZ, MOR, MEL, MTW, OFF, TON and, especially and preferably MFI.

The structure types of the molecular sieve seed and crystalline molecular sieve layers may be the same or different. Further, if the structure types are the same, the compositions may be the same or different. It is preferred that the molecular sieve seeds and the crystalline molecular sieve layer are both of the MFI structure type.

Some of the above material while not being true zeolites are frequently referred to in the literature as such, and this term will be used broadly in this specification.

The process of the present invention provides molecular sieve layers with good separation properties. Molecular sieve layers, especially when in the form of a membrane, have been characterised by means of a number of analytical techniques. One such technique is the dye permeation test as described in WO96/01683. Whilst this test is a good indication as to whether or not unacceptable defects are present in a molecular sieve layer, it is a course test and filter, and does not provide any absolute measurable difference which is quantifiable between different molecular sieve layers which pass the test. Molecular sieve layers have been further characterised using x-ray diffraction, transmission electron microscopy (TEM ) and scan electron microscopy (SEM). Such techniques have been need to characterise molecular sieve membranes in for example WO96/01683. In the context of the present invention these techniques may be used to observe the degree of invasion of the crystalline molecular sieve layer into the support after deposition; however although useful information this is still a qualitative measure of success. Using these techniques it may be seen that supported layers of the present invention are not significantly invaded with deposits of material which constitutes the crystalline molecular sieve layer or other inorganic species. It has been observed that if the layers of the present invention are evaluated for their helium permeance, then they are found to have improved permeances compared to layers not manufactured according to the present invention. Furthermore their paraxylene selectivity and permeance may also be improved.

The molecular sieve layers of the present invention may be treated to further improve or stabilise their properties. In one aspect, whilst intact layer regions are of good quality, there may be regions of the layer which are cracked or where there may be pinholes present. If these cracks and pinholes are of such quantity and dimensions that they have a disproportionate effect on membrane performance then it is useful to reparate the layer. Suitable reparation techniques are described in for example WO96/01682, WO96/01686 and WO97/25129, the disclose of which are incorporated by reference. The preferred method of reparation is that described in WO96/01686. If the molecular sieve layer of the preset invention has no pinholes or cracks which disproportionately effect the layer performance it may still be advantageous to treat the molecular sieve layer to maintain its performance. In this context a suitable treatment is the selectivity enhancing layers described in WO96/01686.

Such selectivity enhancing layers may at the same time also reparate defective molecular sieve layers.

An alternative reparation method involves the use of a hydrolysed crystallisation solution. In this method a hydrolysed synthesis mixture, identical or similar to that used to deposit the crystalline molecular sieve layer, is applied to the support of the crystalline molecular sieve layer on the support. Any suitable application method may be used; one such method is spin-coating at for example 8000 rpm. After deposition of the hydrolysed synthesis mixture the surface of the crystalline molecular sieve is further treated with an ammonia solution e.g. 0.1 M ammonia to clean the surface. The treated and ammonia cleaned crystalline molecular sieve layer is then exposed to moisture at elevated temperatures, ideally in a closed autoclave at 100° C. for 24 hours. After exposure to moisture the crystalline molecular sieve is calcined. A suitable calcination regime is heating to 400° C. in air for 6 hours using a heat-up and cool-down rate of 2° C. per minute. This reparation method is particularly suitable for reparation of crystalline molecular sieve layers which have been manufactured using the pre-impregnation making method.

The process of the present invention provides active crystalline molecular sieve layers with good properties. When the active inorganic material is a catalyst in enables the porosity of the support to be maintained to facilitate access of the reactants to the catalyst surface. When the active inorganic material is a membrane it allows the porosity of the support to be maintained to ensure that it does not exhibit resistance to the flow of material through the membrane. When used for the manufacture of molecular sieve membranes the process of the present invention provides membranes which have the enhanced combination of selectivity and permeance, even for relatively thin membranes of less than 1 um.

The thickness of the crystalline molecular sieve layer may be any thickness and its desired thickness is dependant on the intended use. Generally for membrane applications it should be as thin as possible; for catalyst applications it may have consider able thickness in excess of for example of 100 µn and may have a non-uniform thickness.

For membrane applications the thickness of the crystalline molecular sieve layer is advantageously less than 3 µm, more advantageously less than 2 µm and preferably 1 µm or less most preferably 0.5 µm or less. Advantageously, the thickness of the layer and the crystallite size of the crystalline molecular sieve are such that the layer thickness is approximately the size of the longest edges of the crystals, giving essentially a monolayer in which the crystals are oriented such the crystalline molecular sieve layer exhibits a columnar appearance when viewed in cross-section by SEM. In such a structure the majority of the inter-grain boundaries are oriented substantially perpendicular to the plane which approximates to the interface between the support and crystalline molecular sieve layer. The crystalline molecular sieve layer contains substantially no crystals which are orientated such that the plane of their grain to grain interfaces are parallel to the support/crystalline molecular sieve layer interface; without wishing to be bound to any theory, the inventors believe that such interfaces may reduce the performance of the membrane. This structure may be present in thin or thick layers of the present invention.

It is preferred that when utilised as a membrane the combined thickness of the molecular sieve seed layer and the crystalline molecular sieve layer is 3 µm or less, preferably 2 µm or less, and most preferably 1 µm or less. I should be understood that catalyst embodiments of the present invention may also have such combined thickness.

The layers may be configured as a membrane, a term used herein to describe a barrier having separation properties, for separation of fluid (gaseous, liquid, or mixed) mixtures, for example, separation of a feed for a reaction from a feedstock mixture, or in catalytic applications, which may if desired combine catalysed conversion of a reactant or reactants and separation of reaction product.

The following Examples, in which parts are by weight unless indicated otherwise, illustrate the invention:

EXAMPLES

A. Examples of Impregnation Methods

Method 1

A one inch diameter alumina disk with a molecular sieve seed layer deposited on one surface was placed with the non-deposited surface face down on a filter paper that had been soaked with an acrylic resin. The disk was left in place until the resin had diffused through the non-deposited surface and upto the top surface of the deposited layer. Completion of this impregnation was detected optically by a change in the appearance of the top surface of the disk.

The impregnated disk was then removed from the resin and the excess resin present on the no-deposited surface was removed with a low lint paper wipe. A UV accelerator for curing the resin was applied to the non-deposited surface of the disk and it was allowed to diffuse into the acrylic resin in the disk for a period of five minutes after which the excess accelerator was wiped from the disk. The acrylic resin was then cured by exposure through the deposited surface of the disk to UV light for greater than eight hours. After curing the impregnated support was ready for deposition of a crystalline molecular sieve layer.

Method 2

In this method a mixture of acrylic resin and accelerator are impregnated through the surface of the support carrying the deposited molecular sieve seed layer and acrylic resin in the impregnated support is cured in the same way.

Method 3

α-alumina supports (one inch diameter discs 3 mm thick) having a porosity of about 33% and pores of approximately 80 to 100 nm, were cleaned and then a molecular sieve seed layer was deposited onto one surface.

A petri dish was partially filled with H101 hydrocarbon wax which was melted at 150° C. in a vacuum oven. The coated support was placed on a holder in the wax filled petri dish such that only the support surfaces which were free of seeds were submerged in the wax. This ensured that the seed layer did not come into direct contact with the wax. The vacuum pump was switched on and after 2 minutes it was switched off at a vacuum of <50 mbar. The oven was brought to atmospheric pressure and the impregnated wax was allowed to solidify within the pores of the support. This impregnated support was now ready for deposition of a crystalline molecular sieve layer.

B. Para-xylene Separation Test

Figure 1:
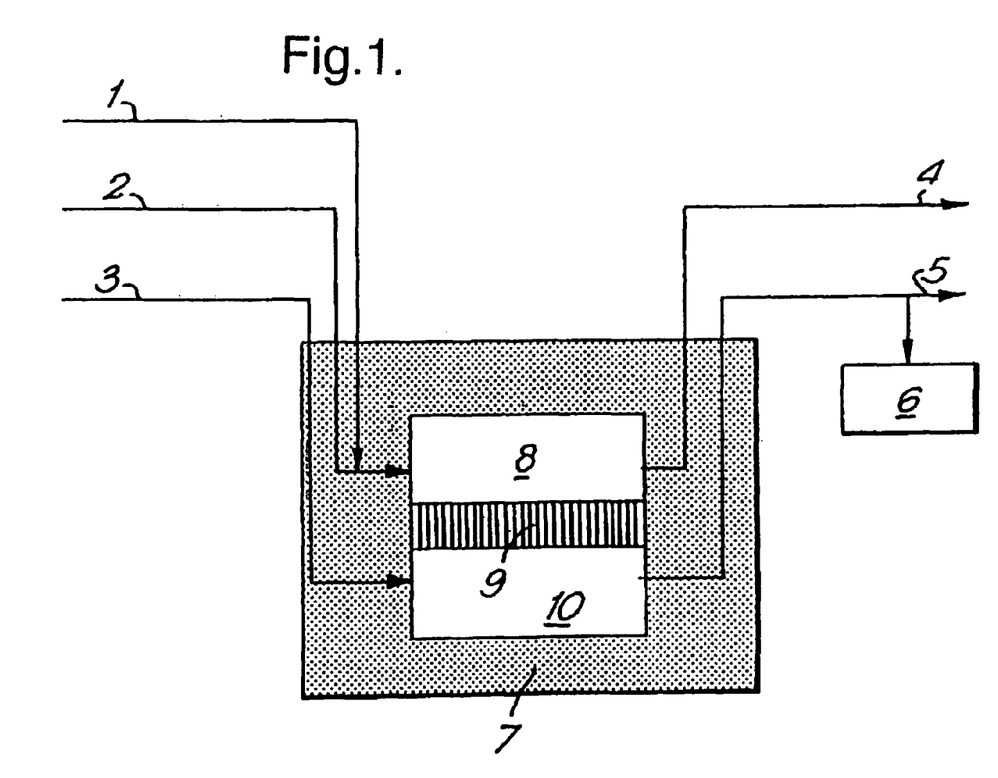

A simplified diagram of a unit used to test the crystalline molecular sieve membrane layers is shown in FIG. 1. Hydrogen feed (1) and aromatics feed (2), are mixed, preheated and vaporised inside a sand bath (7). A hydrogen sweep (3) is also preheated in the sand bath (7). The hydrogen feed (1) combined with aromatics feed (2) flow into the feed side (8) of a stainless steel cell (11) containing the crystalline molecular sieve layer on a porous support (9).

The hydrogen sweep (3) flows into the same stainless steel cell but into the sweep side (10). This cell is designed such that selected components from the aromatics feed pass through the membrane from the feed side into the sweep side at process conditions. A product stream labelled retentate (4), which is the feed depleted of select components, and permeate (5), which is the sweep enriched with selected components from the feed, separately, but simultaneously, flow out of the stainless steel cell. The permeate (5) is analysed by an on-line chromatograph (GC) (6), and the composition of the permeate is used in conjunction with the permeate flow to calculate the flow of each individual component through the membrane.

Following is a detailed description of the testing procedure.

1. A molecular sieve membrane on a porous support is mounted into a metal (steel) cell and sealed with a graphoil o-ring. It is preferable to have the surface of the steel cell passivated so that it does not induce catalytic cracking and coking reactions in the test. The catalytic activity of the cell and the membrane assembly can be assessed by measuring the level of cracking products in the permeate. It is also preferable to pretreat the graphoil o-ring so that it does not outgass carbonaceous materials which have the potential of fouling the membrane and reducing observed xylenes flows through the membrane. One procedure for pretreating graphoil o-rings is by heating up under air at 450° C. for 3 h followed by cooling to room temperature. It should be noted that the graphoil o-ring is applied directly to the zeolite layer or any selectivity-enhancing coating or reparation layer if applied.
2. The cell with the membrane mounted inside is ten heated to a temperature of at least 250° C. and ideally between 360 and 4000° C. A suitable heating rate is ~2° C./min. While the membrane is being heated, hydrogen is flowed across the feed and sweep side of the membrane. Flow rates of hydrogen for the tests with a ~2.5 cm diameter membrane sealed with a graphoil gasket which exposes an area of 2.91 cm$^{2.91}$ to the feed are:

| Example | ml/min at 100 kPa absolute on the feed side | ml/min at 100 kPa absolute on the sweep side |
| --- | --- | --- |
| 1 to 3 | 20 | 10 |
| 4 to 6 | 100 | 100 |
| 7 | 120 | 200 |

It should be noted that the feed side is the side of the membrane structure sealed by the graphoil gasket (i.e. the side on which the zeolite layer is deposited).

For the ~2.5 cm diameter membrane, a liquid hydrocarbon mixture which is primarily composed of xylene isomers is introduced at a rate of 4 ml/h for examples 1 to 3 and 33 ml/h for examples 4 to 7, into the hydrogen flowing on the feed side of the membrane. The line carrying the mixture to the cell passes through enough of a hot zone to vaporize the feed and to bring the mite to the temperature at which the test is to be conducted. The pressure on the feed side is then increased by at least 50×10$^3$ Pa, ideally at least 100×10$^3$ Pa absolute for Examples 4 to7. This provides a Δp across the membrane of at least 50×10$^3$ Pa and ideally at least 100×10$^3$ Pa 12. The pressure is increased to 100×10$^3$ Pa absolute for Examples 1 to 3. At the testing temperatures, the hydrogen partial pressure on the feed side is approximately equal to the hydrogen partial pressure in the flowing hydrogen sweep steam. With this testing procedure, hydrogen transference through the membrane is minimised and there is said to be hydrogen balance.

The composition of the aromatic hydrocarbon mixture used in the Examples 4 to 7 was nominally 70% meta-xylene (mX), 20% para-xylene (pX), 5% ethylbenzene (EB), and 5% trimethyl-benzene (TMB) by weight; variations in this composition is acceptable. In the context of the present invention reference to aromatic hydrocarbon partial pressure is to the partial pressure of a mixture of meta-xylene (mX), para-xylene (pX), ethylbenzene (EB), and trimethyl-benzene (TMB). It is preferable that the oxygen level in these mixtures be low to prevent chemical reactions which can lead to coking. This can be done by degassing the mixtures, or by formulating the mixtures from oxygen free solvents.

For examples 1 to 3 the composition nominally was 50% metaxylene (mX), 20% paraxylene (pX), 15% orthoxylene (oX), and 15% ethylbenzene (EB) by volume.

The composition of the hydrocarbons in the permeate stream is measured with an FID detector in a gas chromatograph. The integrated area for each component is used to deduce the flux of each component; the integrated area can be related to the mass fraction of a component in the permeate by a calibration procedure in which a known concentration of mixture components is passed through the gas chromatograph.

The values selected for characterising the membrane may be taken at a number of pressures and temperatures. The performance of the membrane is monitored with time. The test reading may be taken at any time after the membrane is at the required temperature and pressure and after introduction of the hydrocarbon feed. It may be desirable to delay the reading until the membranes selectivity properties are relatively stable. The performance readings are taken as the maximum values for Q and α attained during the test. The exact point in time at which the test reading is taken will vary with the temperature and test pressures used. What is important is that the test result is taken at the maximum performance values. Ideally this test result is taken at least 1 hour after introduction of the hydrocarbon feed. In these experiments, the test readings were taken at various times between 1 to 20 hours after introduction of the hydrocarbon feed. For the reparated membrane the test result was taken at 1 hour.

Hydrogen flow rates are measured in permeate and retenate. It is preferred that the performance of the membranes is achieved at hydrogen balance.

The permeance of hydrocarbon component A is calculated as follows:

$$\text{Permeance of } A = \frac{\text{Mass Flow Rate of } A \text{ in Permeate}}{(\text{Partial Pressure of } A \text{ in Feed} - \text{Partial Pressure of } A \text{ in Sweep}) * \text{Area}}$$

Area = Membrane area exposed to feed by graphoil gasket

Permeance is expressed in SI units as mole(px)m$^2$.s.Pa (px) where mole(px) refers to moles of para-xylene, and Pa(px) refers to the paraxylene partial pressure in Pa (an example of a non-SI unit often used in industry is kg$_{px}$/m$^2$.day.bar$_{px}$)and is equal to 1.09×10$^{-9}$ mole(px)m$^2$.s.Pa (px).

Under certain circumstances, the transfer of hydrocarbons through the membrane from feed to sweep is low enough that the partial pressure of hydrocarbons in the sweep is negligible (note that hydrocarbons are not added to the sweep so any hydrocarbons present in the permeate must flow through the membrane). In such circumstances, one may opt to neglect the partial pressure of hydrocarbon A in the sweep and calculate the permeance of A using the partial pressure of hydrocarbon A in the feed as the total be pressure driving force. The error in such approximation is equal to the ratio of the partial press of A in the sweep to the partial pressure of A in the feed. Thus, it follows that if the partial pressure of A in the sweep is much lower than the partial pressure of A in the feed, the error is low. Using the flow rates given here to test the membranes described in this invention, the partial pressure of each hydrocarbon in the sweep is less than five percent of the partial pressure of the same hydrocarbon in the feed. This is the result of having deliberately set the flow rates to attain low transfer of hydrocarbons from feed to sweep during testing. The total transfer of hydrocarbons from feed to sweep was kept at less than five percent the amount of hydrocarbons in the feed. It is preferable that this amount be less than one percent of the amount of hydrocarbons in the feed.

Under these conditions, the partial pressure of hydrocarbons in the sweep were neglected in the calculation of permeance, and the permeances reported here were calculated using the partial pressure of hydrocarbons in the feed as the total transmembrane pressure driving force. The results are quoted as $Q_x$ ($Q_x$=pXy permeance in mole(px) $m^2$.s.Pa(px) and $\alpha_x$ ($\alpha_x$=pXy/mXy selectivity) with x indicating the total aromatic hydrocarbon partial pressure in kPa. The test parameters used in these experiments are as indicated below:

$Q_{100}$ and $\alpha_{100}$

For Examples 4 to 6 these values were measured under the following conditions:

Temperature=360° C.

Feed rate=≧100 ml/min

Sweep rate=≧100 ml/min

The composition of feed and sweep gases, in kPa partial pressure of the gases was as follows:

| Feed/Sweep | Component of Composition | Partial Pressure kPa | Comments |
|---|---|---|---|
| Feed | para-xylene | 25 | Total aromatic hydrocarbon partial pressure = 100 kPa |
|  | meta-xylene | 65 |  |
|  | ethyl-benzene | 5 |  |
|  | tri-methyl-benzene | 5 |  |
|  | Hydrogen | 100 | no net flow of H$_2$ from feed to sweep or vice versa |
| Sweep | Hydrogen | 100 |  |

For Examples 7 these values were measured under the following conditions:

Temperture=400° C.

Hydrogen Feed rate=≧120 ml/min

Sweep rate=≧200 ml/min

The composition of feed and sweep gases, in kPa partial pressure of the gases was as follows:

| Feed/Sweep | Component of Composition | Partial Pressure kPa | Comments |
|---|---|---|---|
| Feed | para-xylene | 20 | Total aromatic hydrocarbon partial pressure = 100 kPa |
|  | meta-xylene | 70 |  |
|  | ethyl-benzene | 5 |  |
|  | tri-methyl-benzene | 5 |  |
|  | hydrogen | 120 | no net flow of H$_2$ from feed to sweep or vice versa |
| Sweep | hydrogen | 115 |  |

$Q_{500}$ and $\alpha_{500}$

These values were measured under the following conditions:

Temperature=360–400° C.

Feed rate=≧200 ml/min

Sweep rate=≧200 ml/min

The composition of feed and sweep gases, in kPa partial pressure of the gases:

| Feed/Sweep | Component of Composition | Partial Pressure kPa | Comments |
|---|---|---|---|
| Feed | para-xylene | 125 | Total aromatic hydrocarbon partial pressure = 500 kPa |
|  | meta-xylene | 325 |  |
|  | ethyl-benzene | 25 |  |
|  | tri-methyl-benzene | 25 |  |
|  | hydrogen | 1200 | no net flow of H$_2$ from feed to sweep or vice versa |
| Sweep | hydrogen | 1200 |  |

It must also be pointed out that because of the low total transfer of hydrocarbons from feed to sweep, the partial pressure of hydrocarbons in the feed is constant across the membrane surface. Because of this and the fact that the partial pressures of hydrocarbons in the sweep are negligible and uniform across the sweep side of the membrane, the partial pressure difference of each hydrocarbon across the membrane is constant across the entire membrane area. Therefore, the permeances reported here are considered point permeances to distinguish them from permeances one can observe in large-area membrane where the concentrations in both feed and sweep sides are allowed to vary across the total membrane area (i.e., the transmembrane pressure difference varies across the membrane area). Such is the case of a large membrane module, where, if one applies the equation of permeance as written, the permeance obtained would be an average permeance in the membrane module. One may refer to this permeance as an integrated or module permeance which would be different than the point permeances provided here. The importance of differentiating between a point permeance and an average or module permeance is that a point permeance is the parameter one must use in engineering the design of a membrane module. An average or module permeance, on the other hand, only applies to that specific membrane module under the testing conditions used.

The selectivity of a component A over a B is caluated as follows:

$$\text{Selectivity } A/B = \frac{\text{Permeance of } A}{\text{Permenace of } B}$$

The selectivities and permeance values for Examples 4 to 7 are provided in Table 1, these illustrate the good performance observed in molecular sieve membranes manufactured using the impregnation technique.

Example 1 and Comparative Example 1

In these examples the supported molecular sieve layers were manufactured as follows:

Support Pretreatment

Two polished α-alumina disks having a porosity of about 33% and pores of approximately 80 to 100 nm, were cleaned ultrasonically in pentane and acetone.

Molecular Sieve Seed Coating

The disks were spin coated with a colloidal suspension of approximately 50 nm colloidal silicalite seeds at 0.25 wt % solids, for 30 seconds at 4000 rpm. Then the disks were heat treated at 350 ° C. for 6 hours (heat up rate 0.3° C./min).

Impregnation

One of the disks was impregnated with LR White Acrylic Resin (Hard Grade, London Resin Company) under vacuum. After impregnation, the disks were covered with xylene, which was spun off after 20 seconds (4000 rpm/30 secs). The resin was cured overnight at 70° C. in a $N_2$-atmosphere. This whole process was repeated once in order to fill any pores that may have opened up through withdrawal of the acrylic during the first curing step.

Desposition of Crystalline Molecular Sieve Layer

The impregnated and non-impregnated disks were placed, seeded side facing downwards, in teflon-lined autoclaves. The disks were ca. 9 mm above the autoclave floor. The synthesis mixture, with molar composition 10 $SiO_2$/0.81 TPABr/0.33 $Na_2O$/2.60 $K_2O$/750 $H_2O$ was poured into the autoclaves, fully covering the disks. The autoclaves were closed, heated up to 140° C. in 30 minutes and kept at 140° C. for 4 hours. The disks were taken out of the autoclaves, washed, dried, and calcined for 6 hours at 500° C. Under these conditions the LR Acrylic resin was removed completely from the impregnated disk.

Air Permeation Test

The air permeation of the two samples was tested prior to reparation and the results are provided in Table 1. It is clear that the crystalline molecular sieve layer of the present invention exhibits a higher air permeation after calcination than the molecular sieve layer which has been deposited on a support without resin impregnation; this suggests a more open structure of the support.

Membrane Reparation

The disks were placed on the vacuum chuck of a Convac MTS-4 spin-coater, covered with Hitachi PIX8144 polyimide, and spun at 6500 rpm for 30 seconds. The polyimide was cured to a maximum temperature of 325° C. These reparated layers were then tested for their xylenes separation performance.

TABLE 1

Crystalline molecular sieve layer Performance

| Disk no. | Air permeation** ml/min | pX/mX selectivity* | pX permeance* Mole(px)/m2 · s · Pa(px) |
|---|---|---|---|
| Example 1 | 10.9 | 13.6 | $1.48 \times 10^{-8}$ |
| Comparative Example 1 | 3.3 | 5.5 | $5.99 \times 10^{-9}$ |

*1 bara, ΔP = 0, 360° C.
**Room Temperature, ΔP = 2 bar

Characterization Example 1 and Comparative Example 1

SEM analysis after testing has shown at both layers show the same structure and thickness of the seed layer (0.5 μm), deposited molecular sieve layer (0.6 μm) and polyimide reparation layer (1.1 μm). Under secondary electron imaging SEM, comparative example 1 exhibits a dark zone of ca. 50 μm thickness at the top of the support which is indicative of support invasion by material derived from the synthesis solution. This is confirmed by EDX analysis, element mapping and line scans for silicon. The layer according to the present invention does not show a dark zone and EDX shows very minor support invasion.

Examples 2, 3, and Comparative Examples 2 to 5

The above process was repeated with a number of possible impregnating materials including silicone oils; the results are provided in the following Table 2

TABLE 2

Impregnation Tests

| Disk | Impregnation Method | Comments |
|---|---|---|
| Comparative Example 2 | Soaking in silicon oil | Silicon oils escapes from support and floats on synthesis mixture. Part of disk surface is hydrophobic |
| Comparative Example 3 | Soaking in hexadecane | Hexadecane escapes from support. SEM/EDX shows extensive support invasion |
| Comparative Example 4 | Precipitation of $CaCl_2$ into pores of support | Almost completely inhibits zeolite layer growth |
| Comparative Example 5 | Polyimide PIX 8144 deposition. | Forms overcoating. PIX layer comes off |
| Example 2 | Soak in PVC dissolved in THF*** Applied to large pore support (80 to 160 nm and larger) with no seed layer. | Minimal Support invasion. |
| Example 3 | Soak in molten H231 wax ($T_m$ = 110° C.) Hydrothermal synthesis is at less than 110° C. | Zeolite layer deposited; no support invasion. |

***THF = tetra-hydro-furan

Examples 4 to 7

Preparation of Alumina Porous Support

Porous alumina supports were cleaned as follows:
1. Ultrasonicate in water for 10 minutes.
2. Heat teat in air overnight at 700° C.
3. Ultrasonicate in pentane for 10 mins.
4. Remove and dry in air for 10 minute.
5. Ultrasonicate in acetone for 10 minutes.
6. Remove and dry in air for 10 minutes.
7. Ultrasonicate in methanol for 10 minutes
8. Remove and dry for approximately 2 hours at 110° C. and cool to room temperature.

Preparation of Colloidal Seeds

Silicalite colloidal seeds of ~50 nm particle size were prepared according to the general method as described in WO93/08125.

Deposition of Seed Layer

The colloidal seeds were deposited on the cleansed alumina s by spin-coating, a colloidal suspension of 0.5% by weight of ~50 nm sized MFI crystals with a pure silica composition and as prepared above.

A porous alpha-alumina disk of diameter 25 mm, thickness 3 mm, pare size 80 nm, and ~33% porosity by volume, was machined and polished on one face. The disk was then placed in the specimen chuck of a CONVAC Model-4 spinner and brought up to a spinning speed of 4000 rpm.

Once this spinning speed had been reached 2ml of the seed solution was applied to the centre of the disk and spinning was continued to a total of 30 seconds. The coated disk was placed in an oven and heated upto a temperature of 425° C. or 450° C. at a heat-up rate of 0.3° C./min and held at the terminal temperature for 6 hours. After 6 hours the coated disk was cooled at a rate of 0.5° C./min until the disk reached room temperature.

Impregnation

A petri dish was partially filled with H101 hydrocarbon wax, which had been melted at 150° C. in a vacuum oven. The porous support, with seed layer deposited thereon, was placed on a holder in the wax filled petri dish such that only the surface of the support which was free of deposited seeds was submerged in the wax. This ensured that the seed layer did not come into contact with the wax. The vacuum pump was switched on and after 2 minutes it was switched off at a vacuum of <50 mbar. The oven was brought to atmospheric pressure and the impregnated wax was allowed to crystallise within the pores of the support. This impregnated support was now ready for deposition of a crystalline molecular sieve layer.

Preparation of Hydrothermal Synthesis Solutions

A solution was prepared of 0.92 g NAOH (98.4% purity) in 138.14 g of water. Into this solution was dissolved 7.12 g of tetrapropylammonium bromide (TPABr:Fluka). To this mixture was added 76.66 g of colloidal silica solution (Ludox AS 40, supplied by Du Pont) and the resulting mixture was stirred with a magnetic stirrer for 2 to 10 minutes. The resulting molar composition was as follows:

0.22 $Na_2O$:0.52 TPABr:10 $SiO_2$:200 $H_2O$

Hydrothermal Synthesis

The impregnated support with seed coating was mounted in a holder with the spin-coated face pointing downwards, near the surface of the synthesis mixture in an autoclave. The autoclave was closed, placed in an oven, and heated during 30 minutes to the crystallisation temperatures and maintained at that temperatures for the period specified in the following Table. The oven was then allowed to cool to room temperature. After cooling, the disk was removed and washed in demineralized water until the conductivity of the last washing water was ≦5 μS/cm. The disk was then dried in an oven at 125° C. After drying the resulting structure was calcined and tested for para-xylene separations performance. The calcination conditions were sufficient to remove substantially all the impregnating material.

Selectivity Enhancing Coating

One crystalline molecular sieve layer was teat using the procedure described in Example 3 of WO96/01686 to provide a selectivity enhancing layer on the crystalline molecular sieve layer. The resulting structure was also tested for par-xylene separation performance.

Xylenes Separation Test

This was undertaken using the method identified above. The selectivity values and permeances for the layers manufactured using the process of the present invention are provided in Table 3.

Examples 4 and 5 illustrate the effect of the additional step of reparation on in the process of the present invention. Example 5 is reparated and exhibits exceptionally high selectivity for paraxylene whilst maintain an acceptable permeance.

Helium Permeance and Weight Gain

A number of samples were prepared using the general procedure given above for Examples 4 to 7. The support was impregnated with hydrocarbon wax through the surface which was remote from the seed layer and to a depth of approximately 1 mm from that surface. A further set of examples were prepared without support impregnation. A third set of examples was prepared using extended impregnation times of approximately 20 minutes.

These samples were then evaluated to assess their permeance to Helium and to measure the weight gain of the support after deposition of the molecular sieve layer.

Figure 2:
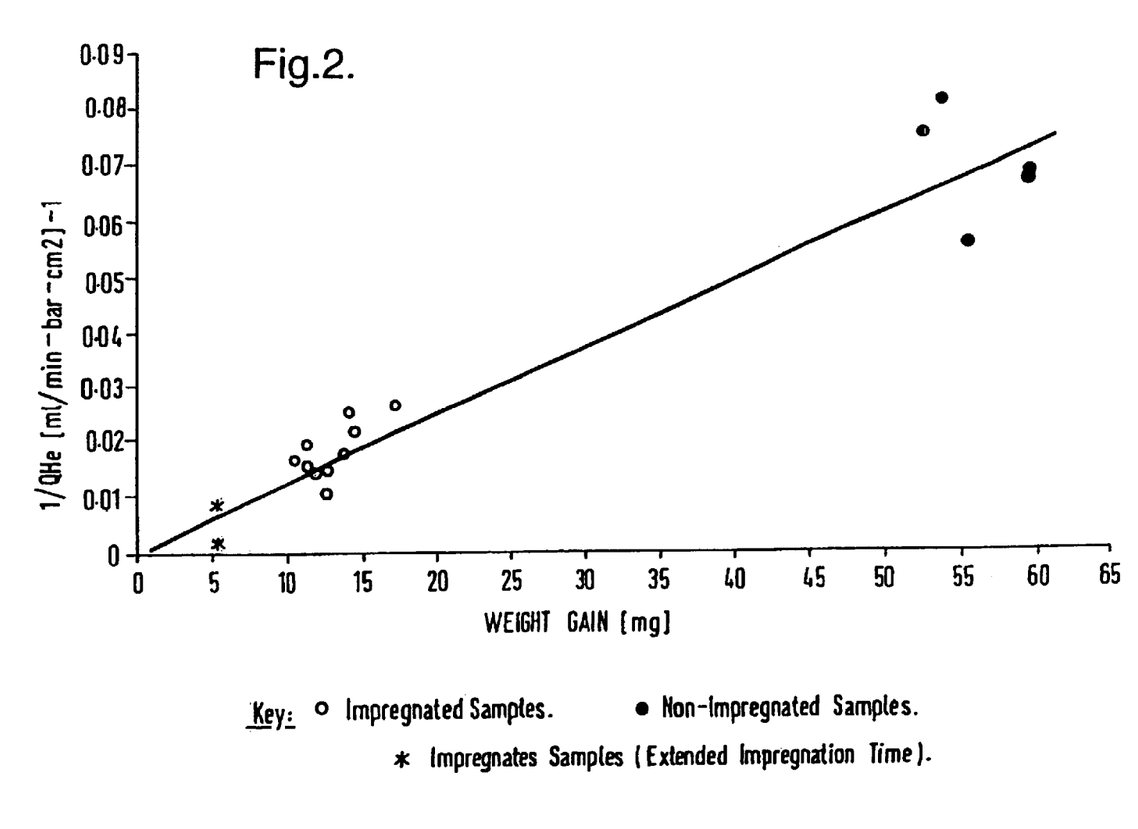

The results are provided in FIG. 2. FIG. 2 shows the inverse of helium permeance versus weight gain. The helium permeances in this figure are the values for the membrane only with correction for the support effects.

The helium flow through the cleaned support is measured by pressurising one side of the support with helium at 200 kPa absolute pressure whilst maintaining the opposite side at 100 kPa absolute pressure. Helium flows from the high pressure side to the low pressure side where the flow (ml/min) is measured with the aid of a flow meter. The helium permeance in the support ($Q_{He}$,support) is then calculated by dividing the flow of helium measured by the product of the membrane area exposed to helium $cm^2$) and the difference in pressure between the high and low pressure sides (1 bar). The same procedure is performed after a membrane is grown on the support which gives the helium permeance in the membrane plus support ($Q_{He}$, ZM+Support).

By using a series resistance model of the form;

$$\frac{1}{Q_{He,ZM+Support}} = \frac{1}{Q_{He,ZM}} + \frac{1}{Q_{He,Support}}$$

the helium permeance in the membrane only ($Q_{He,ZM}$) is calculated.

It can be seen that those samples which were prepared in accordance with the invention exhibit a significantly higher helium permeance compared to the other samples and in addition exhibit significantly lower weight gains. The weight gain is a combination of the desired crystalline molecular sieve layer and unwanted material which is deposited within the support structure.

TABLE 3

| Example | Test Temp ° C. | Time on oil hours | Seed Layer Thickness μm | Molecular Sieve Layer Thickness μm | Combined Thickness μm | Qx $10^{-8}$ $mole_{px}/m^2 \cdot s \cdot Pa_{px}$ | $\alpha_x$ |
|---|---|---|---|---|---|---|---|
| 4 | 360 | 6 | 0.5 | 0.5 | 1 | $Q_{100} = 5.8$ | $\alpha_{100} = 3.2$ |
| 5 | 360 | 1 | 0.5 | 0.5 | 1 | $Q_{100} = 0.81$ | $\alpha_{100} = 103$ |
| 6 | 360 | 6 | 0.5 | 0.5 | 1 | $Q_{100} = 5.8$ | $\alpha_{100} = 2.8$ |
| 7 | 400 | 6 | 0.5 | 0.5 | 1 | $Q_{100} = 9.6$ | $\alpha_{100} = 5.4$ |

Example 8

Support Cleaning

An α-alumina disk, 2.5 mm diameter, 3 mm thickness, with bulk 3 µm pore size, and several intermediate layers, with a top layer of 100 nm pore size (available from Inocermic GmbH, Hermsdorf, Germany) was cleaned by rinsing in acetone and filed ethanol (0.1 µm filter, Anotop™, Whatman) and dried.

Pre-impregnation Masking

A solution of 1 part by weight PMMA (polymethylmetacrylate distributed by Polykemi AB, Ystad, Sweden as CM 205, MW 100,000 g/mole, polydispersity 1.8) in 3.75 parts by weight acetone, was passed through a 0.1 µm pore filter (Anotop™ Whatman), and was brought onto the top surface of the support by using a syringe, filter and needle. The deposited solution was then carefully dried by first drying at room temperature overnight and then by heat with a rate of 1 °C./h to 150° C.

Support Impregnation

Hydrocarbon wax (H101 wax) was impregnated from the back of the masked support support for 1 hour hour at 150° C. under an applied vacuum according to the procedure described in Examples 1 to 4 above.

Removal of Pre-impregnation Masking

After impregnation the PMMA coating was removed by washing in acetone, ethanol and the support was then washed with a filtered (0.1 µm filter, Anotop™, Whatman) 0.1 M ammonia solution.

Deposition of Molecular Sieve Seeds

The impregnated support was soaked in a 0.4% aqueous cationic polymer solution (Redifloc 4150, Eka Nobel AB, Sweden pH adjusted to 8.0 by the addition of ammonia) which was prepared from distilled and filtered (0.1 µm filter, Anotop™, Whatman) water and filtered through a 0.8 µm filter (Acrodisc™, Pall) immediately before use. The soaking time was 10 minutes. The support was subsequently rinsed 4 times with a filtered (0.1 µfilter, Anotop™, Whatman) 0.1 M ammonia solution. The support was immersed for 10 minutes in a sol containing 1% ~60 nm silicalite-1 crystals. The pH of the sol was 10.0. The support was subsequently rinsed 4 times with a filtered (0.1 µm filter, Anotop™, Whatman) 0.1 M ammonia solution.

Hydrothermal Synthesis:

The seeded supports were treated in a hydrolyzed synthesis mixture with the molar composition $3TPAOH:25SiO_2:1500H_2O:100EtOH$ which was heated during 30 h in silicone oil at a temperature of 100° C. After cooling, the membrane was rinsed in 0.1 M ammonia solution. The resultant membrane was calcined.

The calcined membrane showed the following performance when tested as above but without hydrogen balance, and averaged over t=1–2 hours and a sweep flow of 200 ml/min:

$Q_{100}=1.1\times 10^{-7}$ mole/m$^2$.s.Pa (102 kg$_{px}$/m$^2$.day.bar$_{px}$)

$\alpha_{100}=13.2$

The test was then continued at higher pressure, and the system was adjusted to obtain hydrogen balance which was obtained at 19.5 hours; the performance averaged over t=19.5–20.5 hours was:

$Q_{500}=2.75\times 10^{-8}$ mole/m$^2$s.Pa (25 kg$_{px}$/m$^2$.day.bar$_{px}$)

$\alpha_{500}=4.8$

Example 9

A membrane was prepared as in the Example 10, with the exception that the crystallization time was 72 hours.

Reparation of Membrane

A hydrolyzed synthesis mixture, as used for crystallizing the layer (see Example 10), was applied to the disk by spin-coating at 8000 rpm. While still spinning, the surface was cleaned using 0.1 M ammonia. The treated membrane was put on a holder above the liquid level in a 65 ml autoclave containing 10 ml water. The closed autoclave was held at 100° C. for 24 hours.

The treated membrane was held at 400° C. in air for 6 hours, heat-up and cool-down rate was 2° C./minute.

The resulting membrane showed the following performance after 2 hours exposure to the hydrocarbon stream:

$Q_{100}=1.06\times 10^{-7}$ mole/m$^2$.s.Pa (97 kg$_{px}$/m$^2$.day.bar$_{px}$)

$\alpha_{100}=17.4$.

What is claimed is:

1. A process for the manufacture of a crystalline molecular sieve layer, which process comprises:
    a) impregnating a porous support through at least one surface thereof, with an impregnating material which is not carbonised prior to deposition on the support of a crystalline molecular sieve layer,
    b) hydrothermally growing a crystalline molecular sieve layer on a surface of the impregnated support; and
    c) substantially completely removing the impregnating material,
  wherein the impregnating material is an organic resin.

2. A process as claimed in claim 1 wherein the organic resin is a hydrocarbon resin.

3. A process as claimed in claim 2 wherein the hydrocarbon resin is an acrylic resin.

4. A process as claimed in claim 2 wherein the hydrocarbon resin is a hydrocarbon wax.

5. A process as claimed in claim 1 wherein the impregnating material substantially fills the pores of the support.

6. A process as claimed in claim 1 wherein the surface on which the crystalline molecular sieve layer is grown has deposited thereon molecular sieve seed crystals prior to the hydrothermal growth, and wherein the porous support is impregnated before or after deposition of the molecular sieve seeds.

7. A process as claimed in claim 6 wherein the molecular sieve seeds are deposited prior to impregnation and the impregnating material substantially fills the pores of the support or the pores of the support and those between the seeds.

8. A process as claimed in claim 6 wherein the molecular sieve seeds are present as a discrete layer.

9. A process as claimed in claim 1 wherein the crystalline molecular sieve layer is an MFI type molecular sieve.

10. A process as claimed in claim 1 wherein a pre-impregnation masking layer is applied to the support prior to impregnation and is subsequently removed after impregnation.

11. A process as claimed in claim 1 wherein the porosity of the support is 30% by volume or greater.

12. A process as claimed in claim 1 wherein the crystalline molecular sieve present in the layer comprises non-contiguous molecular sieve crystals.

13. A process as claimed in claim 1 wherein the crystalline molecular sieve present in the layer comprises contiguous molecular sieve crystals.

14. A process as claimed in claim 1 wherein the crystalline molecular sieve present in the layer comprises contiguous molecular sieve crystals arranged as a membrane.

15. A process as claimed in claim 1 wherein the impregnation is undertaken for a period of 20 minutes or greater.

16. A process for the manufacture of a crystalline molecular sieve layer, which process comprises:

a) impregnating a porous support through at least one surface thereof, with an impregnating material which is not carbonised prior to deposition on the support of a crystalline molecular sieve layers, b) hydrothermally growing a crystalline molecular sieve layer on a surface of the impregnated support; and c) substantially completely removing the impregnating material, wherein a pre-impregnation masking layer is applied to the support prior to impregnation and is subsequently removed after impregnation and wherein the pre-impregnation masking material is polymethylmethacrylate.

17. A process as claimed in claim 16 the impregnating material is an organic resin.

18. A process for the manufacture of a crystalline molecular sieve layer, which process comprises:

a) impregnating a porous support through at least one surface thereof, with an impregnating material which is not carbonised prior to deposition on the support of a crystalline molecular sieve layer, b) hydrothermally flowing a crystalline molecular sieve layer on a surface of the impregnated support; and c) substantially completely removing the impregnating material, wherein the porous support is partially impregnated, the impregnated support has molecular sieve seeds deposited thereon and the crystalline molecular sieve is derived from a synthesis solution which comprises colloidal silica.

19. A process as claimed in claim 18 wherein the impregnating material is an organic resin.

* * * * *